(12) United States Patent
Matsui

(10) Patent No.: US 9,186,975 B2
(45) Date of Patent: Nov. 17, 2015

(54) CONTROL APPARATUS FOR HYBRID VEHICLE

(75) Inventor: Hiroki Matsui, Ebina (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 289 days.

(21) Appl. No.: 13/501,820

(22) PCT Filed: Oct. 13, 2010

(86) PCT No.: PCT/JP2010/067905
§ 371 (c)(1),
(2), (4) Date: Apr. 13, 2012

(87) PCT Pub. No.: WO2011/046123
PCT Pub. Date: Apr. 21, 2011

(65) Prior Publication Data
US 2012/0203417 A1 Aug. 9, 2012

(30) Foreign Application Priority Data

Oct. 14, 2009 (JP) .................. 2009-237193

(51) Int. Cl.
*B60W 10/06* (2006.01)
*B60W 20/00* (2006.01)
(Continued)

(52) U.S. Cl.
CPC . *B60K 6/48* (2013.01); *B60K 6/547* (2013.01); *B60L 11/14* (2013.01); *B60L 11/1851* (2013.01);
(Continued)

(58) Field of Classification Search
CPC ......... B60K 6/48; B60K 6/442; B60W 10/06; B60W 20/00; B60W 20/40; B60W 20/106; B60W 2510/244; B60W 2510/246; B60W 2510/0638

USPC ............... 701/22, 54, 55, 67, 68; 180/65.265, 180/65.1, 65.225, 65.245, 65.25, 65.28, 180/65.285, 65.29
See application file for complete search history.

(56) References Cited

U.S. PATENT DOCUMENTS 7,208,847 B2   4/2007   Taniguchi
2003/0173934 A1*   9/2003   Arimitsu .................. 322/34
(Continued)

FOREIGN PATENT DOCUMENTS

CN   101208230 A   6/2008
JP   62-247799 A   10/1987
(Continued)

OTHER PUBLICATIONS

Chinese Office Action dated Dec. 12, 2014, 5 pgs.

*Primary Examiner* — Fadey Jabr
*Assistant Examiner* — Kevin P Mahne
(74) *Attorney, Agent, or Firm* — Foley & Lardner LLP

(57) ABSTRACT

A hybrid vehicle has, on a driveline, an engine, a motor/generator, a clutch and driving wheels, and transmits a driving force from the engine to the driving wheels through the motor/generator and the engaged clutch and brings a drive load that is applied to the engine from the driving wheels to a no-load state by disengagement of the clutch. A control apparatus of the hybrid vehicle has a racing control section which, when an accelerator depression operation is done in a state in which the engine is in the no-load state, in a case where a torque absorption restriction condition that restricts torque absorption by the motor/generator with an engine torque being a power-generation torque is satisfied, restricts an rotation speed of the engine.

6 Claims, 8 Drawing Sheets

(51) Int. Cl.
  *B60L 11/02* (2006.01)
  *B60K 6/48* (2007.10)
  *B60K 6/547* (2007.10)
  *B60L 11/14* (2006.01)
  *B60L 11/18* (2006.01)
  *B60W 10/02* (2006.01)
  *B60W 10/08* (2006.01)
  *B60W 30/18* (2012.01)
  *F16H 61/04* (2006.01)

(52) U.S. Cl.
  CPC ............... *B60W 10/02* (2013.01); *B60W 10/06* (2013.01); *B60W 10/08* (2013.01); *B60W 20/00* (2013.01); *B60W 30/18027* (2013.01); *B60K 2006/4825* (2013.01); *B60W 2510/0208* (2013.01); *B60W 2510/0638* (2013.01); *B60W 2510/244* (2013.01); *B60W 2510/246* (2013.01); *B60W 2540/10* (2013.01); *F16H 2061/0477* (2013.01); *Y02T 10/6221* (2013.01); *Y02T 10/6252* (2013.01); *Y02T 10/6286* (2013.01); *Y02T 10/70* (2013.01); *Y02T 10/7005* (2013.01); *Y02T 10/705* (2013.01); *Y02T 10/7077* (2013.01)

(56) References Cited

U.S. PATENT DOCUMENTS

| | | | |
|---|---|---|---|
| 2005/0258651 A1 | 11/2005 | Taniguchi | |
| 2006/0090940 A1* | 5/2006 | Ito et al. | 180/65.2 |
| 2006/0237246 A1* | 10/2006 | Severinsky et al. | 180/65.2 |
| 2006/0243501 A1* | 11/2006 | Hidaka | 180/65.1 |
| 2011/0053735 A1* | 3/2011 | Lewis et al. | 477/99 |

FOREIGN PATENT DOCUMENTS

| | | |
|---|---|---|
| JP | 05-044551 A | 2/1993 |
| JP | 08-182114 A | 7/1996 |
| JP | 09-071138 A | 3/1997 |
| JP | 10-084636 A | 3/1998 |
| JP | 2004-050910 A | 2/2004 |
| JP | 2004-316502 A | 11/2004 |
| JP | 2005-323425 A | 11/2005 |
| JP | 2006-137332 A | 6/2006 |

* cited by examiner

CONTROL APPARATUS FOR HYBRID VEHICLE

TECHNICAL FIELD

The present invention relates to a control apparatus for a hybrid vehicle provided, on a driveline, with an engine, a motor/generator, a clutch and driving wheels, which performs a racing control on the basis of an accelerator depression operation in an engine no-load state.

BACKGROUND ART

In related art techniques, in a hybrid vehicle provided with the motor/generator at an output shaft of the engine for getting torque assistance, upon an engine stall start or an engine racing, the torque assistance by the motor/generator is forbidden. With this operation, decrease in voltage of battery etc. is prevented, thereby bringing improvement in fuel economy of the engine (see, for example, Patent Document 1).

Here, "racing" used in the present specification indicates engine racing or engine rpm surge in which when the accelerator depression operation is done in the state in which the engine is in the no-load state at the time of acceleration including the vehicle start, an engine rotation speed (an engine rpm) increases according to the accelerator depression operation.

CITATION LIST

Patent Document 1: Japanese Patent Application Kokai Publication No. 8-182114

SUMMARY OF THE INVENTION

In the hybrid vehicle, at a time of a racing selection by which the clutch is engaged from an engine racing state and the vehicle is accelerated, in order to accelerate the vehicle with good response while suppressing heat generation of the clutch, it is preferable that after the engine rotation speed is decreased by the motor/generator and a difference rotation speed between an input rotation speed and an output rotation speed of the clutch is decreased, the clutch be engaged.

However, when decreasing the engine rotation speed by the motor/generator, in a case where it is impossible to produce an absorption torque by the motor/generator, for instance, in a case where a battery charge capacity is high then energy from the motor/generator can not be charged by the battery, it is not possible to decrease the difference rotation speed of the clutch by the motor/generator. Thus, there is a problem that heat amount of the clutch engaged by the racing selection becomes excessive.

Further, in a case where temperature of the motor/generator or temperature of the battery is very high, the temperature of the motor/generator or the temperature of the battery further increases at the time of the torque absorption by the motor/generator, and this might cause a problem that degrades performance and decreases endurance of the motor/generator and the battery.

For these problems, it is therefore an object of the present invention to provide a control apparatus for the hybrid vehicle which is capable of preventing the problems associated with execution of the racing control and accelerating the vehicle with good response while suppressing heat generation of the clutch when a condition that the torque absorption by the motor/generator be restricted is satisfied upon the racing operation at the time of acceleration including the vehicle start.

To achieve the above object, the hybrid vehicle of the present invention has, on a driveline, an engine, a motor/generator, a clutch and driving wheels, and transmits a driving force from the engine to the driving wheels through the motor/generator and the engaged clutch and brings a drive load that is applied to the engine from the driving wheels to a no-load state by disengagement of the clutch. A control apparatus of the hybrid vehicle comprises a racing control section which, when an accelerator depression operation is done in a state in which the engine is in the no-load state, in a case where a torque absorption restriction condition that restricts torque absorption by the motor/generator with an engine torque being a power-generation torque is satisfied, restricts an rotation speed of the engine.

DESCRIPTION OF EMBODIMENTS

Figure 1:
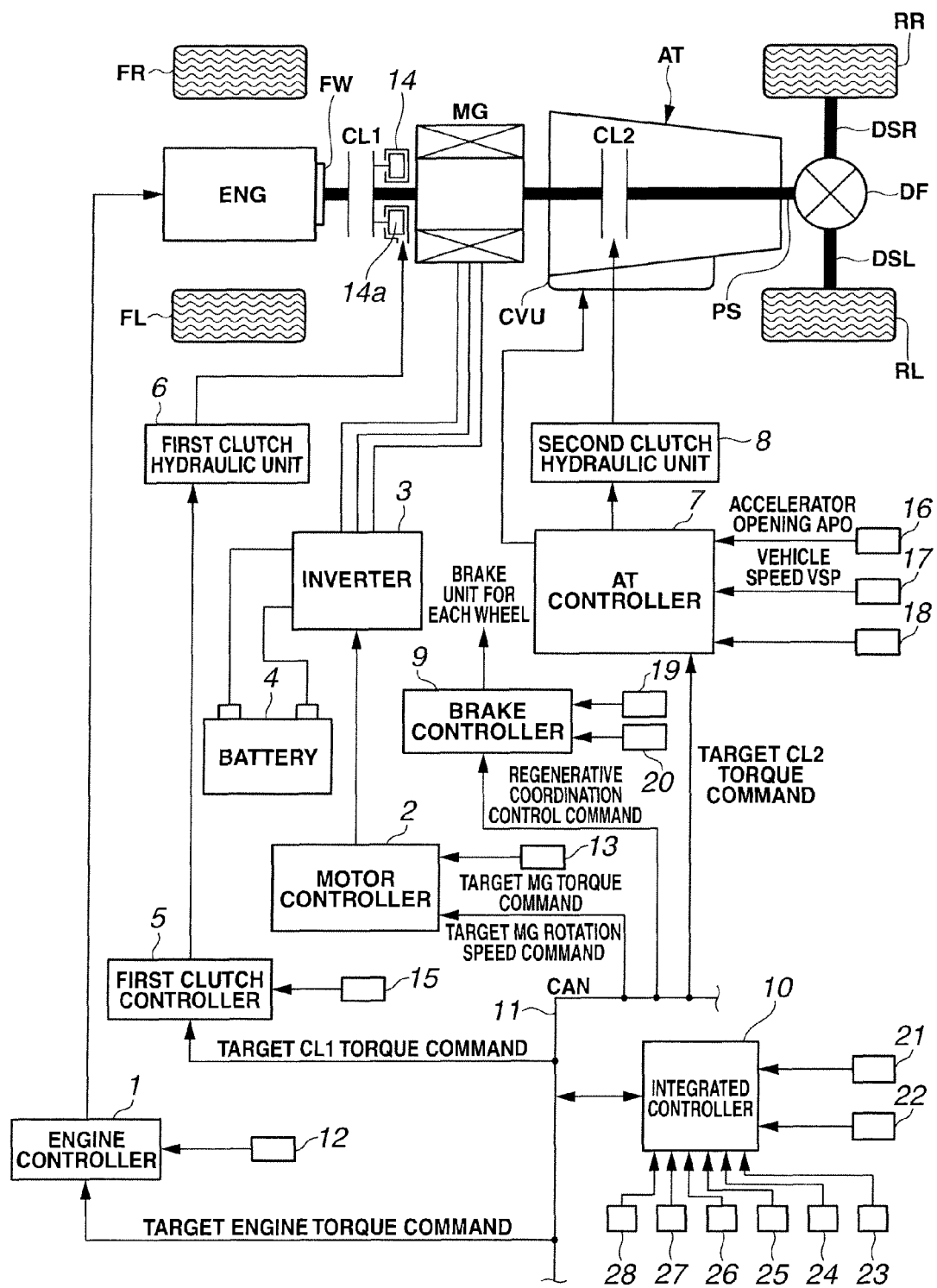
FIG. 1 is a whole system block diagram showing a rear-wheel-drive FR hybrid vehicle (an example of the hybrid vehicle) employing a control apparatus of an embodiment 1.

In a normal racing control, when the racing operation in which the accelerator is depressed is done in the state in which the engine is in the no-load state, the racing is permitted, while the torque absorption by the motor/generator is permitted upon the acceleration of the vehicle, thereby (decreasing the difference rotation speed of the clutch by the decrease of the engine rotation speed and accelerating the vehicle with good response while suppressing the heat generation of the clutch. However, in the case where the racing and the torque absorption are permitted when the torque absorption restriction condition is satisfied, since suppression of increase in the engine rotation speed by the torque absorption can not be expected, problems arise, namely that the difference rotation speed of the clutch is expanded. Further, since the torque absorption by which heat load is applied to a motor/generator system continues, temperature of the motor/generator system further increases.

For these problems, in the hybrid vehicle of the present invention explained below, when the torque absorption restriction condition is satisfied at the time of the racing operation, the engine rotation speed is restricted irrespective of an accelerator depression amount. Thus, for instance, in a case where the battery charge capacity is high, the expansion of the difference rotation speed of the clutch is suppressed, and the heat amount of the clutch engaged by the racing selection is prevented from becoming excessive. In addition, for instance, in the case where the temperature of the motor/generator system is high, the temperature of the motor/generator system is prevented from further increasing.

As a consequence, when the condition that the torque absorption by the motor/generator be restricted is satisfied upon the racing operation at the time of acceleration including the vehicle start, the problems associated with execution of the racing control can be prevented, and the vehicle can be accelerated with good response while suppressing the heat generation of the clutch.

In the following description, a best mode that realizes a control apparatus of the hybrid vehicle of the present invention will be explained on the basis of an embodiment 1 shown in the drawings.

Embodiment 1

First, a system will be explained. FIG. 1 is a whole system block diagram showing a rear-wheel-drive FR hybrid vehicle (an example of the hybrid vehicle) employing a control apparatus of the embodiment 1.

As can be seen in FIG. 1, a driveline of the FR hybrid vehicle in the embodiment 1 has an engine Eng, a flywheel FW, a first clutch CL1, a motor/generator MG, a second clutch CL2 (a clutch), an automatic transmission AT, a propeller shaft PS, a differential gear DF, a left drive shaft DSL, a right drive shaft DSR, a rear-left wheel (driving wheel) RL, and a rear-right wheel (driving wheel) RR. FL is a front-left wheel, FR is a front-right wheel.

The engine Eng is a gasoline engine or a diesel engine. On the basis of an engine control command from an engine controller 1, an engine start control, an engine stop control and a valve opening control of a throttle valve are carried out. As shown in FIG. 1, the flywheel FW is provided at an engine output shaft.

The first clutch CL1 is an engine separation mechanism, which is arranged between the engine Eng and the motor/generator MG. Engagement and disengagement including half clutch state or partial clutch engagement state, of the first clutch CL1, are controlled by a first clutch control pressure that is produced by a first clutch hydraulic unit 6 on the basis of a first clutch control command from a first clutch controller 5. As the first clutch CL1, for example, a normally-closed dry single disc clutch is used. The normally-closed dry single disc clutch holds its engagement state by a stop of pressure supply to a hydraulic actuator 14 having a piston 14a, and disengages by the pressure supply to the hydraulic actuator 14.

The motor/generator MG is an engine starting and travelling motor by a synchronous motor/generator in which a permanent magnet is embedded in a rotor and a stator coil is wound around a stator. On the basis of a control command from a motor controller 2, the motor/generator MG is controlled through application of a three-phase alternating current that is generated by an inverter 3. This motor/generator MG is driven and rotates then serves a motor function when receiving power supply by discharge of a battery 4. Also, when the rotor receives rotational energy from the engine Eng or the driving wheels, the motor/generator MG serves a generator function that generates an electromotive force at both ends of the stator coil and charges the battery 4. The rotor of this motor/generator MG is connected to the transmission input shaft of the automatic transmission AT.

The second clutch CL2 is a starting element and a slip separation mechanism at the engine start, which is arranged between the motor/generator MG and the rear left and right wheels RL, RR. Engagement and disengagement including slip-engagement and slip-disengagement, of the second clutch CL2, are controlled by a control pressure that is produced by a second clutch hydraulic unit 8 on the basis of a second clutch control command from an AT controller 7. As the second clutch CL2, for example, a wet multiple disc clutch or a wet multiple disc brake, which is capable of continuously controlling an oil flow amount and the oil pressure through a proportional solenoid, is used. Here, the first clutch hydraulic unit 6 and the second clutch hydraulic unit 8 are built into an AT hydraulic control valve unit CVU that is provided in the automatic transmission AT.

The automatic transmission AT is a transmission that automatically changes a shift position of multispeed (multistage) of, for example, forward 7 speeds and reverse 1 speed according to a vehicle speed and an accelerator opening and so on. Here, the above second clutch CL2 is not a clutch that is newly added as a special clutch, but an optimum frictional engagement element that is arranged on a torque transmission path of a selected speed or shift, among a plurality of frictional engagement elements which are engaged in each speed or each shift stage in the automatic transmission AT, is selected as the second clutch CL2. An output shaft of this automatic transmission AT is connected to the rear left and rear right wheels RL, RR through the propeller shaft PS, the differential gear DF, the left drive shaft DSL and the right drive shaft DSR.

The driveline in the hybrid vehicle in the embodiment 1 has, as representative modes which can be classified by drive system, an electric vehicle mode (hereinafter called EV mode), a hybrid vehicle mode (hereinafter called HEV mode) and a driving torque control mode (hereinafter called WSC mode).

The EV mode is a mode in which the first clutch CL1 is disengaged and only power of the motor/generator MG is used as traveling power.

The HEV mode is a mode in which the first clutch CL1 is engaged and power of the engine Eng and the motor/generator MG can be used as the traveling power. When classifying this HEV mode by usage of the motor/generator MG, the REV mode includes an engine vehicle mode (a zero-torque command to the motor/generator MG), a motor assist mode (a positive torque command to the motor/generator MG) and an engine power generation mode (a negative torque command to the motor/generator MG).

The WSC mode is a mode in which, at a time of selection of the HEV mode, the second clutch CL2 is in a slip-engagement state and a clutch torque capacity is controlled so that a clutch transmission torque transmitted through the second clutch CL2 is a required driving torque determined in accordance with a vehicle condition and driver's operation. When the vehicle starts with the HEV mode selected or the vehicle stops with the HEV mode selected and also a vehicle speed VSP is in an area that is less than or equal to a vehicle speed VSP1 (corresponding to an idle rotation speed), by selecting the WSC mode and bringing the second clutch CL2 to the slip-engagement state, an engine stall is prevented and variation or change of the transmission torque is absorbed. Here, "WSC" stands for Wet Start Clutch.

Next, a control system of the hybrid vehicle will be explained.

As shown in FIG. 1, the control system of the hybrid vehicle has the engine controller 1, the motor controller 2, the inverter 3, the battery 4, the first clutch controller 5, the first clutch hydraulic unit 6, the AT controller 7, the second clutch hydraulic unit 8, a brake controller 9, and an integrated controller 10. Here, the engine controller 1, the motor controller 2, the first clutch controller 5, the AT controller 7, the brake controller 9 and the integrated controller 10 are connected with each other through a CAN communication line 11 that allows the exchange of information between them.

The engine controller 1 inputs engine rpm information from an engine rpm sensor 12 and a target engine torque command from the integrated controller 10, also inputs the other information. Then the engine controller 1 outputs a command that controls an engine operating point (Ne, Te) to a throttle valve actuator etc. of the engine Eng.

The motor controller 2 inputs information from a resolver 13 that detects a rotor rotational position of the motor/generator MG, a target MG torque command and a target MG rotation speed command from the integrated controller 10, also inputs the other information. Then the motor controller 2 outputs a command that controls a motor operating point (Nm, Tm) of the motor/generator MG to the inverter 3. In addition, the motor controller 2 measures or checks a battery SOC that indicates a capacity of charge of the battery 4 and voltage of the battery 4. These battery SOC information and battery voltage information are used for the control of the motor/generator MG, and also are sent to the integrated controller 10 through the CAN communication line 11.

The first clutch controller 5 inputs sensor information from a first clutch stroke sensor 15 that detects a stroke position of the piston 14a of the hydraulic actuator 14 and a target CL1 torque command from the integrated controller 10, also inputs the other information. Then the first clutch controller 5 outputs a command that controls the engagement/disengagement of the first clutch CL1 to the first clutch hydraulic unit 6 in the AT hydraulic control valve unit CVU.

The AT controller 7 inputs information from an accelerator opening sensor 16, a vehicle speed sensor 17 (=transmission output rotation sensor) and an inhibitor switch 18. Then, during the travel with a D range selected, the AT controller 7 searches an optimum speed range (optimum speed stage) according to a position on a shift map, of the operating point determined by an accelerator opening APO and a vehicle speed VSP, and also outputs a control command that achieves the searched speed range to the AT hydraulic control valve unit CVU. Here, the shift map is a map where an up-shift line and a down-shift line are drawn according to the accelerator opening and the vehicle speed. In addition to the above automatic transmission control, when inputting a target CL2 torque command from the integrated controller 10, the AT controller 7 executes a second clutch control in which a command that controls the engagement/disengagement of the second clutch CL2 is outputted to the second clutch hydraulic unit 8 in the AT hydraulic control valve unit CVU.

The brake controller 9 inputs sensor information from a wheel speed sensor 19 for detecting each wheel speed of four wheels and a brake stroke sensor 20 and a regenerative coordination control command from the integrated controller 10, also inputs the other information. Then, for instance, in a case where the brake is applied by only a regenerative braking force upon a brake operation by brake pedal depression, when the braking force is lacking for a required braking force according to a brake stroke BS of the brake pedal depression, the brake controller 9 performs a regenerative coordination brake control so that the shortage of the braking force is compensated by a mechanical braking force (a hydraulic braking force or a motor braking force).

The integrated controller 10 is a controller that controls a consumption energy of the whole vehicle, and performs the operation in order for the hybrid vehicle to travel at a maximum efficiency. The integrated controller 10 inputs information from a first clutch input rotation sensor 21, a first clutch output rotation sensor 22, a second clutch input rotation sensor 23, a second clutch output rotation sensor 24, a manual mode switch 25, a battery temperature sensor 26, a motor temperature sensor 27 and an inverter temperature sensor 28, also inputs the other information through the CAN communication line 11. Then the integrated controller 10 outputs the target engine torque command to the engine controller 1, outputs the target MG torque command and the target MG rotation speed command to the motor controller 2, outputs the target CL1 torque command to the first clutch controller 5, outputs the target CL2 torque command to the AT controller 7, and outputs the regenerative coordination control command to the brake controller 9.

Figure 2:
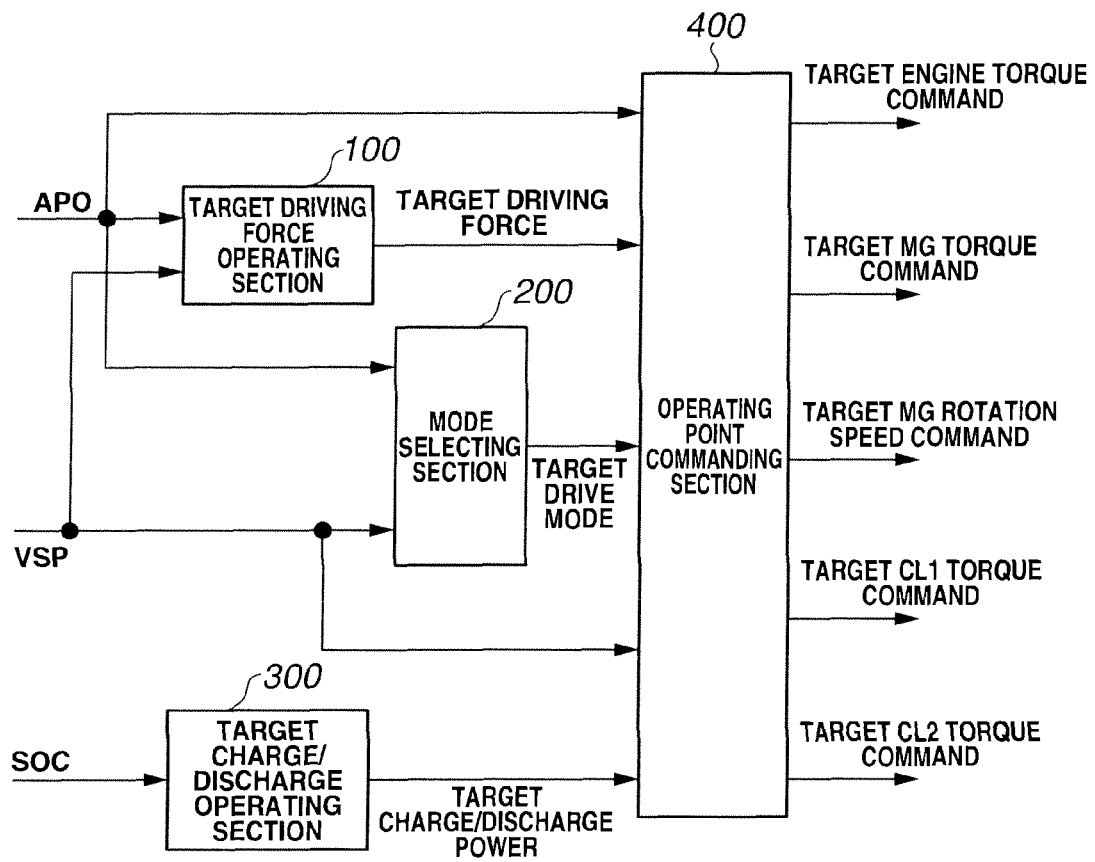
FIG. 2 is a control block diagram showing an operation process executed in an integrated controller 10 in the FR hybrid vehicle employing the control apparatus of the embodiment 1.
Figure 3:
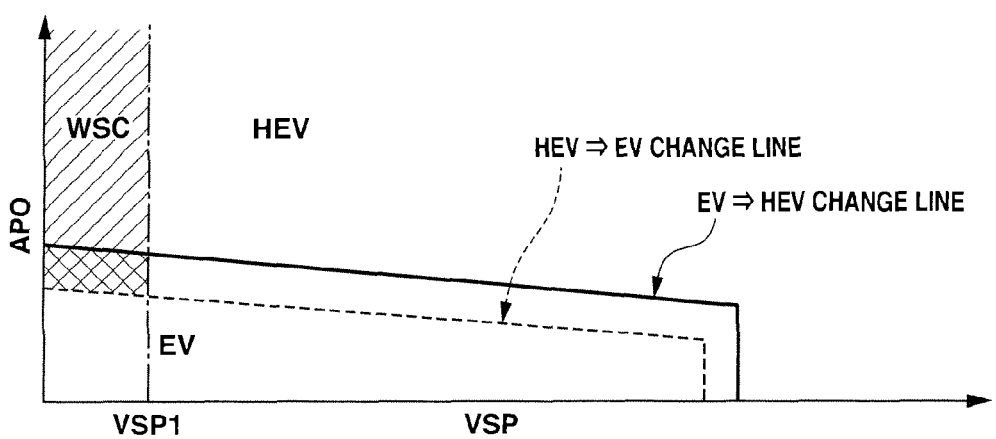
FIG. 3 is an EV-HEV selection map used when performing a mode selection operation in the integrated controller 10 in the FR hybrid vehicle employing the control apparatus of the embodiment 1.
Figure 4:
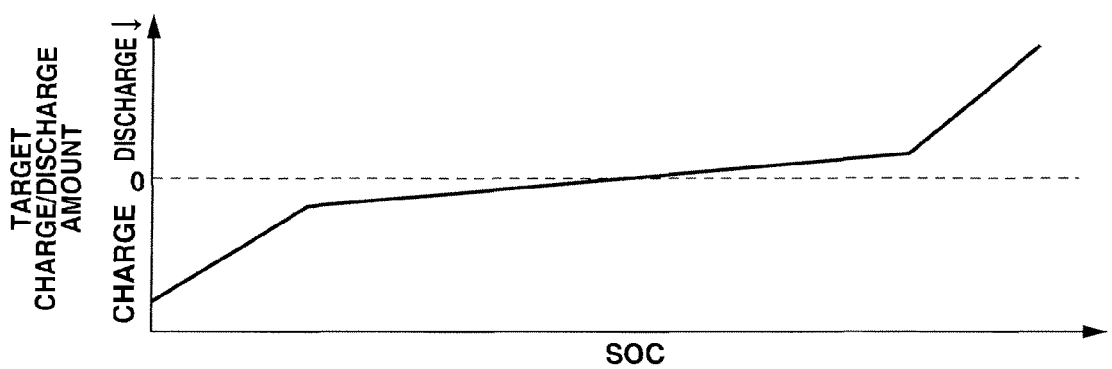
FIG. 4 is a target charge/discharge amount map used when performing a battery charge control in the integrated controller 10 in the FR hybrid vehicle employing the control apparatus of the embodiment 1.

FIG. 2 is a control block diagram showing an operation process executed in the integrated controller 10 in the FR hybrid vehicle employing the control apparatus of the embodiment 1. FIG. 3 is an EV-HEV selection map used when performing a mode selection operation in the integrated controller 10 in the FR hybrid vehicle employing the control apparatus of the embodiment 1. FIG. 4 is a target charge/discharge amount map used when performing a battery charge control in the integrated controller 10 in the FR hybrid vehicle employing the control apparatus of the embodiment 1. In the following description, the operation process executed in the integrated controller 10 will be explained with reference to FIGS. 2 to 4.

As shown in FIG. 2, the integrated controller 10 has a target driving force operating section 100, a mode selecting section 200, a target charge/discharge operating section 300, and an operating point commanding section 400.

The target driving force operating section 100 calculates a target driving force tFo0 on the basis of the accelerator opening APO and the vehicle speed VSP using a target driving force map.

The mode selecting section 200 selects the EV mode or the HEV mode as a target mode from the accelerator opening APO and the vehicle speed VSP using, for example, the EV-HEV selection map shown in FIG. 3. However, if the battery SOC is lower than or equal to a predetermined value, the target mode is set to the HEV mode compulsorily or forcibly. Upon the vehicle start from the HEV mode, until the vehicle speed VSP becomes a first setting vehicle speed VSP1, the WSC mode is selected as the target mode. Upon the vehicle stop in the HEV mode, when the vehicle speed VSP becomes equal to or less than the first setting vehicle speed VSP1, the WSC mode is selected as the target mode.

The target charge/discharge operating section 300 calculates a target charge/discharge power tP from the battery SOC using, for example, a target charge/discharge amount map shown in FIG. 4.

The operating point commanding section 400 calculates the target engine torque, the target MG torque, the target MG rotation speed, the target CL1 torque and the target CL2 torque, as an operating point attainment target, on the basis of input information such as the accelerator opening APO, the target driving force tFo0, the target mode, the vehicle speed VSP and the target charge/discharge power tP. Then the operating point commanding section 400 outputs the target engine torque command, the target MG torque command and the target MG rotation speed command, the target CL1 torque command, the target CL2 torque command to the controllers 1, 2, 5 and 7 respectively through the CAN communication line 11.

Figure 5:
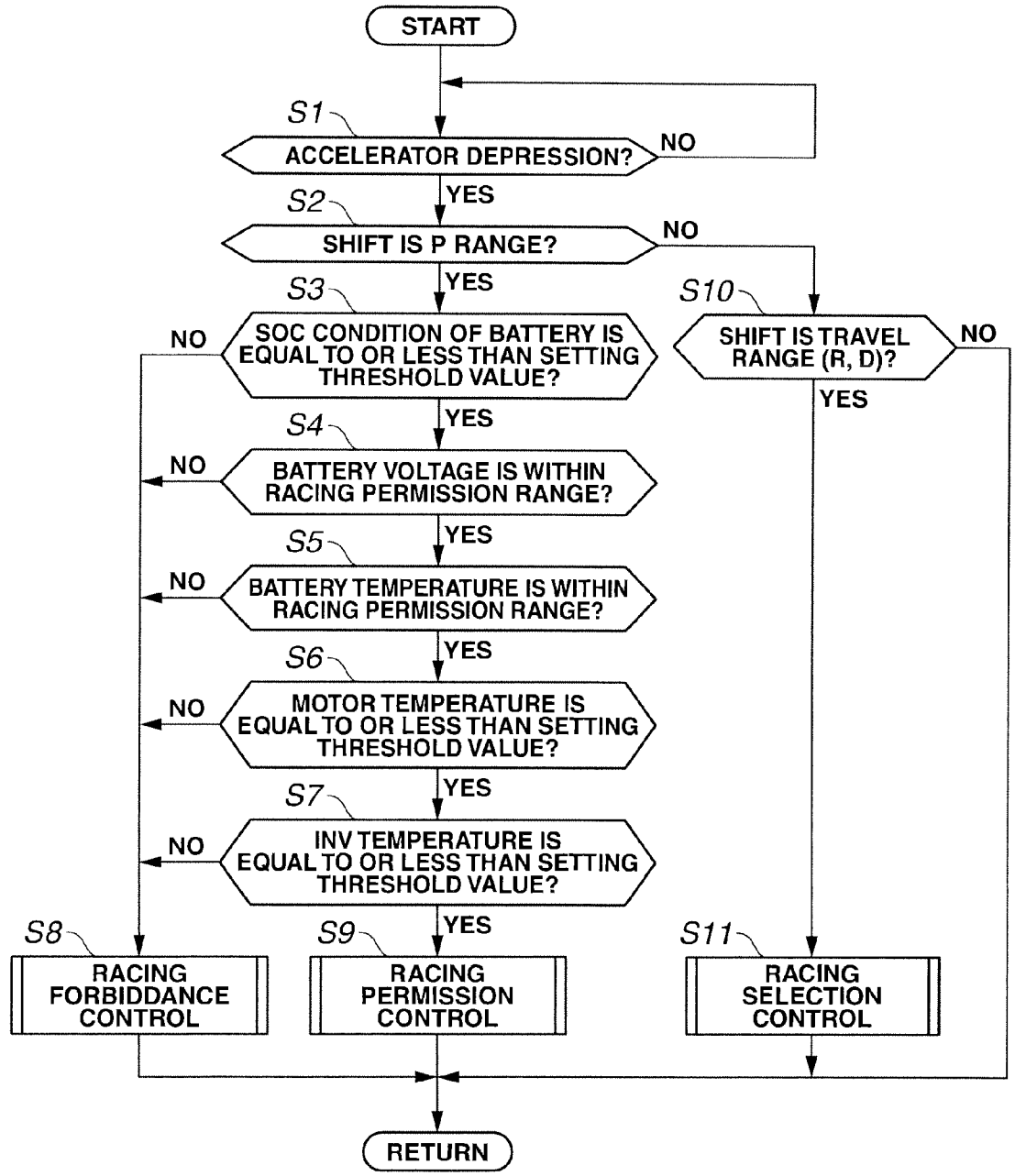
FIG. 5 is a flow chart showing flows of a racing control operation executed in the integrated controller 10 of the embodiment 1.

FIG. 5 is a flow chart (a racing control section) showing flows of a racing control operation executed in the integrated controller 10 of the embodiment 1. In the following description, each step of the flow chart will be explained.

At step S1, a judgment is made as to whether or not an accelerator depression operation is an operation in which the accelerator opening APO from the accelerator opening sensor 16 is equal to or greater than a racing threshold value. If YES (the operation is the accelerator depression operation), the routine proceeds to step S2. If NO (the operation is an accelerator return operation), the routine repeats the judgment of step S1.

At step S2, after judging that the accelerator depression operation is done at step S1, a judgment is made as to whether or not a range position is a P range position (a parking range position) on the basis of shift lever position information from the inhibitor switch 18. If YES (the P range position is selected), the routine proceeds to step S3. If NO (a range position except the P range position is selected), the routine proceeds to step S10.

Here, when the P range position is selected, the first clutch CL1 is in the engagement state and the second clutch CL2 is in the disengagement state. That is, by bringing the second clutch CL2 to the disengagement state, a drive load applied to the engine Eng from the rear left and right wheels RL, RR becomes no-load (the no-load state).

At step S3, after judging that the P range position is selected at step S2, a judgment is made as to whether or not the battery SOC is equal to or less than a setting threshold value, as an SOC condition of the battery 4. If YES (the battery SOC≤the setting threshold value), the routine proceeds to step S4. If NO (the battery SOC>the setting threshold value), the routine proceeds to step S8. In the case where the judgment is NO at this step S3, a battery charge capacity condition (a condition 1) which indicates that the charge capacity of the battery 4 exceeds the setting threshold value is satisfied.

Here, the setting threshold value of the battery SOC is set to a certain value to judge whether a capacity that can absorb (charge) the energy from the motor/generator MG by the battery 4 is sufficiently secured or not, when the engine rotation speed increases in the engine racing state and this increased engine rotation speed is decreased by a negative torque of the motor/generator MG.

At step S4, after judgment of the "the battery SOC≤the setting threshold value" at step S3, a judgment is made as to whether or not the battery voltage is within a setting range that permits the racing. If YES (the battery voltage is within the setting range), the routine proceeds to step S5. If NO (the battery voltage is out of the setting range), the routine proceeds to step S8. In the case where the judgment is NO at this step S4, a battery voltage condition (a condition 2) which indicates that the voltage of the battery 4 is out of the setting range is satisfied.

Here, as same as the condition 1, the setting range of the battery voltage is set to such range, with safety margin, that the battery 4 does not fail by the energy from the motor/generator MG, when the increased engine rotation speed is decreased by the negative torque of the motor/generator MG and the energy from the motor/generator MG is absorbed by the battery 4.

At step S5, after judging that the battery voltage is within the setting range at step S4, a judgment is made as to whether or not battery temperature from the battery temperature sensor 26 is within a setting range that permits the racing. If YES (the battery temperature is within the setting range), the routine proceeds to step S6. If NO (the battery temperature is out of the setting range), the routine proceeds to step S8. In the case where the judgment is NO at this step S5, a battery temperature condition (a condition 3) which indicates that the temperature of the battery 4 is out of the setting range is satisfied.

Here, as same as the condition 1, the setting range of the battery temperature is set to such range, with safety margin, that the battery 4 does not fail by the energy from the motor/generator MG also the battery 4 can surely absorb the energy, when the increased engine rotation speed is decreased by the negative torque of the motor/generator MG and the energy from the motor/generator MG is absorbed by the battery 4.

At step S6, after judging that the battery temperature is within the setting range at step S5, a judgment is made as to whether or not motor temperature from the motor temperature sensor 27 is equal to or less than a setting threshold value. If YES (the motor temperature≤the setting threshold value), the routine proceeds to step S7. If NO (the motor temperature>the setting threshold value), the routine proceeds to step S8. In the case where the judgment is NO at this step S6, a motor temperature condition (a condition 4) which indicates that the temperature of the motor/generator MG exceeds the setting threshold value is satisfied.

Here, the setting threshold value of the motor temperature is set to such threshold value, with safety margin, that the motor/generator MG does not fail by the temperature increase of the motor/generator MG, when the increased engine rotation speed is decreased by the negative torque of the motor/generator MG.

At step S7, after judgment of the "the motor temperature≤the setting threshold value" at step S6, a judgment is made as to whether or not inverter temperature from the inverter temperature sensor 28 is equal to or less than a setting threshold value. If YES (the inverter temperature≤the setting threshold value), the routine proceeds to step S9. If NO (the inverter temperature>the setting threshold value), the routine proceeds to step 98. In the case where the judgment is NO at this step S7, an inverter temperature condition (a condition 5) which indicates that the temperature of the inverter 3 exceeds the setting threshold value is satisfied.

Here, the setting threshold value of the inverter temperature is set to such threshold value, with safety margin, that the inverter 3 does not fail by the temperature increase of the inverter 3, when the increased engine rotation speed is decreased by the negative torque of the motor/generator MG.

At step S8, after judging that at least one torque absorption restriction condition from the conditions 1 to 5 by steps S3, S4, S5, S6 and S7 is satisfied, a racing forbiddance control that restricts the rotation speed of the engine Eng is carried out, and the routine proceeds to RETURN (a racing forbiddance control section).

Figure 6:
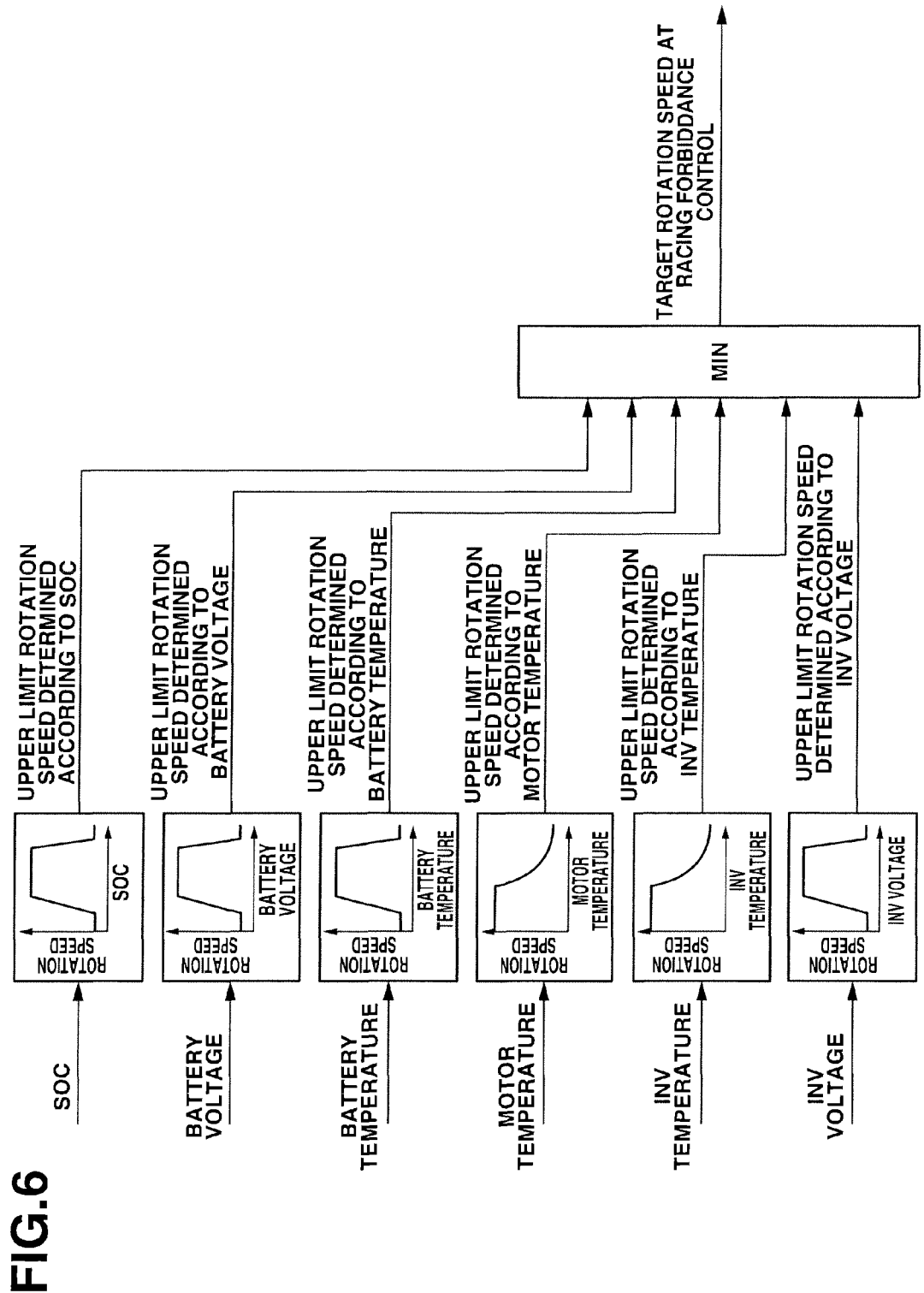
FIG. 6 is a drawing schematically explaining a calculating procedure of a target rotation speed of an engine at a time of a racing forbiddance control of the embodiment 1.

In this racing forbiddance control, as shown in FIG. 6, as a target rotation speed of the engine Eng, the smallest value of an upper limit rotation speed of the engine Eng determined according to the battery SOC, an upper limit rotation speed of the engine Eng determined according to the battery voltage, an upper limit rotation speed of the engine Eng determined according to the battery temperature, an upper limit rotation speed of the engine Eng determined according to the temperature of the motor/generator MG, an upper limit rotation speed of the engine Eng determined according to the inverter temperature and an upper limit rotation speed of the engine Eng determined according to an inverter voltage, is set to the target rotation speed of the engine Eng.

Figure 7:
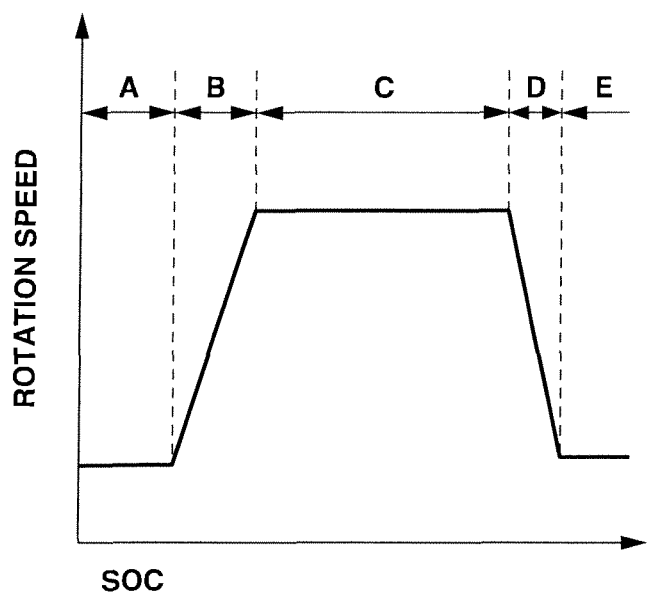
FIG. 7 is a drawing showing an example of a map used when calculating an upper limit rotation speed of the engine at the time of the racing forbiddance control.

As explained in more detail, regarding the upper limit rotation speed (a racing upper limit rotation speed) of the engine Eng determined according to the battery SOC, as shown in FIG. 7, it is set so as to have such characteristic that the engine rotation speed changes to a substantially trapezoidal shape with increase in the battery SOC. More specifically, when a vertical axis is the engine rotation speed and a lateral axis is the battery SOC, in an area A where the battery SOC is small, the upper limit rotation speed is maintained at the idle rotation speed irrespective of a value of the battery SOC. In an area B where the battery SOC is greater than the area A, the upper limit rotation speed increases as compared with the idle rotation speed in proportion to the increase in the battery SOC. In an area C where the battery SOC is greater than the area B, the upper limit rotation speed is maintained at an after-mentioned predetermined limit rotation speed irrespective of the value of the battery SOC. In an area D where the battery SOC is greater than the area C, the upper limit rotation speed decreases as compared with the predetermined limit rotation speed in inverse proportion to the increase in the battery SOC. In an area E where the battery SOC is greater than the area D, the upper limit rotation speed is maintained at the idle rotation speed irrespective of the value of the battery SOC.

With respect to the upper limit rotation speed (the racing upper limit rotation speed) of the engine Eng determined according to the battery voltage, the upper limit rotation speed (the racing upper limit rotation speed) of the engine Eng determined according to the battery temperature and the upper limit rotation speed (the racing upper limit rotation speed) of the engine Eng determined according to the inverter temperature, they are also set so as to have the same characteristic as FIG. 7. That is, when the vertical axis is the engine rotation speed and each lateral axis is the battery voltage, the battery temperature and the inverter temperature, each upper limit rotation speed is set so as to have such characteristic that the engine rotation speed changes to the substantially trapezoidal shape with increase in the battery voltage, the battery temperature and the inverter temperature.

Figure 8:
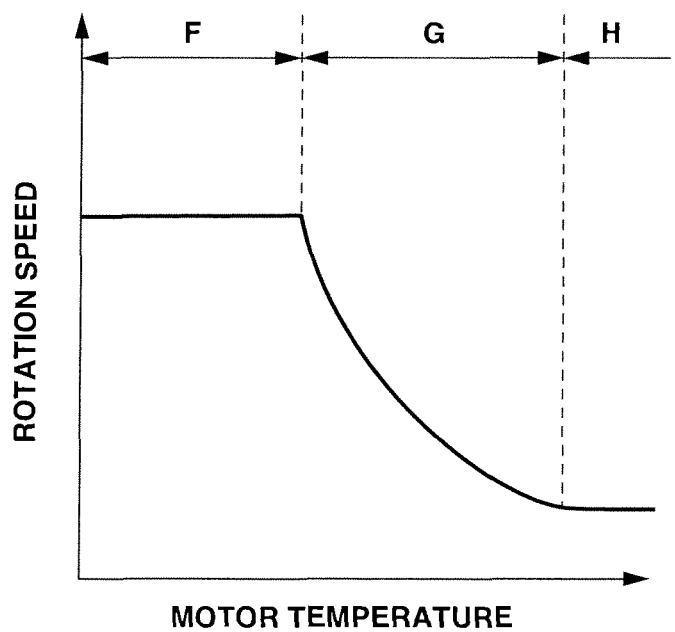
FIG. 8 is a drawing showing an example of a map used when calculating an upper limit rotation speed of the engine at the time of the racing forbiddance control.

As for the upper limit rotation speed (the racing upper limit rotation speed) of the engine Eng determined according to the motor temperature, as shown in FIG. 8, it is set so as to have such characteristic that the engine rotation speed decreases with increase in the motor temperature. More specifically, when the vertical axis is the engine rotation speed and the lateral axis is the motor temperature, in an area F where the motor temperature is low, the upper limit rotation speed is maintained at the above-mentioned predetermined limit rotation speed (described later in detail) that is greater than the idle rotation speed irrespective of a value of the motor temperature. In an area G where the motor temperature is higher than the area F, the higher the motor temperature, the more the upper limit rotation speed decreases from the above-mentioned predetermined limit rotation speed. In an area H where the motor temperature is higher than the area G, the upper limit rotation speed is maintained at the idle rotation speed irrespective of the value of the motor temperature.

Also regarding the upper limit rotation speed of the engine Eng determined according to the inverter temperature, it is set so as to have the same characteristic as FIG. 8. That is, when the vertical axis is the engine rotation speed and the lateral axis is the inverter temperature, the upper limit rotation speed is set so as to have such characteristic that the engine rotation speed decreases with increase in the inverter temperature.

Here, the areas A and E in FIG. 7 and the area H in FIG. 8 are the areas where, as described above, the upper limit rotation speed of the engine Eng is set to the idle rotation speed. The areas B and D in FIG. 7 and the area G in FIG. 8 are areas where the upper limit of the engine rotation speed during the racing is restricted by the restriction of the torque absorption by the motor/generator MG. In these areas B and D in FIG. 7 and area G in FIG. 8, by limiting the engine rotation speed during the racing to the upper limit rotation speed, the engine rotation speed can be sufficiently decreased by the absorption torque of the motor/generator MG within the restricted absorption torque of the motor/generator MG before the engagement of the second clutch CL2. Therefore, upon the engagement of the second clutch CL2, the difference rotation speed of the second clutch CL2 becomes sufficiently small, thereby suppressing the heat generation of the second clutch CL2.

Here, the restricted absorption torque (a limit value of the motor absorption torque) of the motor/generator MG when determining the upper limit rotation speed of the engine Eng according to the battery SOC is set by the same idea as the above-mentioned condition 1. That is, the limit value of the motor absorption torque at this time is set to such value that the capacity can sufficiently absorb (charge) the energy from the motor/generator MG by the battery 4, when decreasing the increased engine rotation speed by the negative torque of the motor/generator MG.

The restricted absorption torque (the limit value of the motor absorption torque) of the motor/generator MG when determining the upper limit rotation speed of the engine Eng according to the battery voltage is set by the same idea as the above-mentioned condition 2. That is, the limit value of the motor absorption torque at this time is set to such value, with safety margin, that the battery 4 does not fail by the energy from the motor/generator MG, when decreasing the increased engine rotation speed by the negative torque of the motor/generator MG and absorbing the energy from the motor/generator MG by the battery 4.

The restricted absorption torque (the limit value of the motor absorption torque) of the motor/generator MG when determining the upper limit rotation speed of the engine Eng according to the battery temperature is set by the same idea as the above-mentioned condition 3. That is, the limit value of the motor absorption torque at this time is set to such value, with safety margin, that the battery 4 does not fail by the energy from the motor/generator MG also the battery 4 can surely absorb the energy from the motor/generator MG, when decreasing the increased engine rotation speed by the negative torque of the motor/generator MG and absorbing the energy from the motor/generator MG by the battery 4.

The restricted absorption torque (the limit value of the motor absorption torque) of the motor/generator MG when determining the upper limit rotation speed of the engine Eng according to the temperature of the motor/generator MG is set by the same idea as the above-mentioned condition 4. That is, the limit value of the motor absorption torque at this time is set to such value, with safety margin, that the motor/generator MG does not fail by the temperature increase of the motor/generator MG, when decreasing the increased engine rotation speed by the negative torque of the motor/generator MG.

The restricted absorption torque (the limit value of the motor absorption torque) of the motor/generator MG when determining the upper limit rotation speed of the engine Eng according to the inverter temperature is set by the same idea as the above-mentioned condition 5. That is, the limit value of the motor absorption torque at this time is set to such value, with safety margin, that the inverter 3 does not fail by the temperature increase of the inverter 3, when decreasing the increased engine rotation speed by the negative torque of the motor/generator MG.

The restricted absorption torque (the limit value of the motor absorption torque) of the motor/generator MG when determining the upper limit rotation speed of the engine Eng according to the inverter voltage is set by the same idea as the above-mentioned condition 2. That is, the limit value of the motor absorption torque at this time is set to such value, with safety margin, that the inverter 3 does not fail by the energy from the motor/generator MG, when decreasing the increased engine rotation speed by the negative torque of the motor/generator MG and absorbing the energy from the motor/generator MG by the battery 4.

Each upper limit rotation speed of the area C in FIG. 7 and the area F in FIG. 8 is set to the predetermined limit rotation speed that is such rotation speed that the engine rotation speed can be sufficiently decreased by the motor/generator MG in a short time from a start point of a vehicle acceleration control to the engagement of the second clutch CL2 upon the acceleration (the vehicle start). That is, the absorption torque of the motor/generator MG of the area C in FIG. 7 is not a torque that is limited by the battery SOC, the battery voltage, the battery temperature and the inverter voltage. Also, the absorption torque of the motor/generator MG of the area F in FIG. 8 is not a torque that is limited by the temperature of the motor/generator MG and the inverter temperature.

In this racing forbiddance control, if the target rotation speed of the engine Eng is the idle rotation speed, the rotation speed control is performed for the motor/generator MG so that the engine Eng is maintained at the idle rotation speed. As a result, a control that generates the power equivalent to the engine torque by the idle rotation speed is performed. Further, in this racing forbiddance control, if the target rotation speed of the engine Eng is a rotation speed other than the idle rotation speed, a torque cut control that outputs the zero-torque command is performed for the motor/generator MG. The second clutch CL2 that is the starting clutch is held in the disengagement state as it is.

At step S9, after judgment of "the inverter temperature≤the setting threshold value" at step S7, in other words, after judging that all the torque absorption restriction conditions of the conditions 1 to 5 by steps S3, S4, S5, S6 and S7 are not satisfied, a racing permission control is carried out, and the routine proceeds to RETURN (a racing permission control section).

In this racing permission control, the torque cut control that outputs the zero-torque command is performed for the motor/generator MG. As for the engine Eng, an engine operation control that, after increasing the engine rotation speed according to the accelerator depression operation, maintains the engine rotation speed at a rotation speed that is within the target rotation speed determined by a power-generation torque limit amount, is performed. The second clutch CL2 that is the starting clutch is held in the disengagement state.

At step S10, after judging that the range position except the P range position is selected at step S2, a judgment is made as to whether or not the range position is a travel range position by an R range position (a reverse range position) or a U range position (a drive range position). If YES (the travel range position is selected), the routine proceeds to step S11. If NO (a range position except the travel range position, such as N range position, is selected), the routine proceeds to RETURN.

Here, in a case where the N range position (a neutral range position) is selected, both of the first clutch CM and the second clutch CL2 are brought to the disengagement state.

At step S11, after judging that the travel range position is selected (the racing is selected) at step S10, a racing selection control is carried out, and the routine proceeds to RETURN (a racing selection control section).

In this racing selection control, an engine operation control which outputs a command that generates the target driving force and torque equivalent to a power-generation amount is performed for the engine Eng. As for the motor/generator MG, a motor rotation speed control by which the MG rotation speed is the idle rotation speed is performed. As for the second clutch CL2 that is the starting clutch, a clutch engagement control that engages the second clutch CL2 from the disengagement state by a torque corresponding to the accelerator opening is performed.

Next, operation of the present invention will be explained.

The operation by the control apparatus of the hybrid vehicle of the embodiment 1 will be explained, in order of [Racing forbiddance control operation], [Problem prevention operation in each torque absorption restriction condition], [Racing permission control operation], [Racing selection control operation] and [Racing control transition operation].
[Racing forbiddance control operation].

When the accelerator depression operation is done in the state in which the engine Eng is in the no-load state by selecting the parking range, in the flow chart in FIG. 5, the routine proceeds along step S1, step S2 step S3. At step S3, the condition 1 that is the torque absorption restriction condition is judged.

When the judgment of the SOC condition of the battery 4 as to whether "the battery SOC is equal to or less than the setting threshold value" or not is made at step S3 then "the battery SOC≤the setting threshold value" is judged, the routine proceeds to step S4 from step S3. However, when "the battery SOC>the setting threshold value" is judged, the routine proceeds to step S8 from step S3. At step S8, the racing forbiddance control that restricts the rotation speed of the engine Eng is carried out regardless of the accelerator depression operation.

When "the battery SOC≤the setting threshold value" is judged at step S3 and the routine proceeds to step S4, the judgment of the battery voltage condition (the condition 2) as to whether the battery voltage is within the setting range that permits the racing is made at step S4. Then when "the battery voltage is within the setting range" is judged, the routine proceeds to step S5 from step S4. However, when "the battery voltage is out of the setting range" is judged, the routine proceeds to step S8 from step S4. At step S8, the racing forbiddance control that restricts the rotation speed of the engine Eng is carried out regardless of the accelerator depression operation.

When "the battery voltage is within the setting range" is judged at step S4 and the routine proceeds to step S5, the judgment of the battery temperature condition (the condition 3) as to whether the battery temperature is within the setting range that permits the racing is made at step S5. Then when "the battery temperature is within the setting range" is judged, the routine proceeds to step S6 from step S5. However, when "the battery temperature is out of the setting range" is judged, the routine proceeds to step S8 from step S5. At step S8, the racing forbiddance control that restricts the rotation speed of the engine Eng is carried out regardless of the accelerator depression operation.

When "the battery temperature is within the setting range" is judged at step S5 and the routine proceeds to step S6, the judgment of the motor temperature condition (the condition 4) as to whether "the motor temperature is equal to or less than the setting threshold value" or not is made at step S6. Then when "the motor temperature is equal to or less than the setting threshold value" is judged, the routine proceeds to step S7 from step S6. However, when "the motor temperature exceeds the setting threshold value" is judged, the routine proceeds to step S8 from step S6. At step S8, the racing forbiddance control that restricts the rotation speed of the engine Eng is carried out regardless of the accelerator depression operation.

When "the motor temperature is equal to or less than the setting threshold value" is judged at step S6 and the routine proceeds to step S7, the judgment of the inverter temperature condition (the condition 5) as to whether "the inverter temperature is equal to or less than the setting threshold value" or not is made at step S7. Then when "the inverter temperature is equal to or less than the setting threshold value" is judged, the routine proceeds to step S9 from step S7. However, when "the inverter temperature exceeds the setting threshold value" is judged, the routine proceeds to step S8 from step S7. At step S8, the racing forbiddance control that restricts the rotation speed of the engine Eng is carried out regardless of the accelerator depression operation.

Here, a normal racing control operation which is a premise in the embodiment 1 will be explained.

When the racing operation in which the accelerator is depressed is done in the state in which the engine Eng is in the no-load state, the racing that increases the engine rotation speed is permitted, while the torque absorption that absorbs the engine torque by a power-generation torque of the motor/generator MG is permitted, thereby suppressing the increase in the engine rotation speed. Therefore, when the vehicle starts with the second clutch CL2 engaged by the racing selection operation, since the difference rotation speed of the second clutch CL2 can be suppressed low, it is possible to accelerate the vehicle with good response while suppressing the heat generation of the second clutch CL2.

However, in the case where the racing and the torque absorption are permitted when the torque absorption restriction condition is satisfied, the following problems occur.

When the torque absorption restriction condition is satisfied, since the suppression of increase in the engine rotation speed by the torque absorption can not be expected, the difference rotation speed of the second clutch CL2 is expanded, and the heat amount of the second clutch CL2 engaged by the racing selection becomes excessive. Especially when the torque absorption restriction condition by which the torque absorption itself is restricted from the beginning or from the midpoint is satisfied, the heat ion of the second clutch CL2 becomes pronounced.

Since the torque absorption by which heat load is applied to the motor/generator MG etc. continues despite the fact that the torque absorption restriction condition is satisfied, the temperatures of the motor/generator MG, the inverter 3 and the battery 4 further increase. Especially when the temperatures of the motor/generator MG, the inverter 3 and the battery 4 are previously high and the torque absorption itself is required to be restricted from the beginning, the influence by the temperature increase becomes pronounced.

Since the charge of the battery 4 starts by the torque absorption by the motor/generator MG and the charge of the battery 4 continues despite the fact that the torque absorption restriction condition is satisfied, the battery voltage goes out of a proper voltage range. Especially when the battery voltage is out of a racing permissible range and the torque absorption itself is required to be restricted from the beginning, the influence exerted on the battery 4 becomes pronounced.

For these problems, the racing control of the embodiment 1 is configured to restrict the rotation speed of the engine Eng regardless of the racing operation when at least one torque absorption restriction condition of the conditions 1 to 5 is satisfied at the time of the racing operation.

In the case where the torque absorption restriction condition is satisfied, since the torque absorption itself is restricted from the beginning or from the midpoint, if the racing control is performed, the difference rotation speed of the second clutch CL2 is expanded, and the heat amount of the second clutch CL2 engaged by the racing selection becomes excessive. For this problem, by forbidding the racing control regardless of the racing operation when the condition that restricts the torque absorption by the motor/generator MG is satisfied upon the racing operation, the expansion of the difference rotation speed of the second clutch CL2 is suppressed. It is therefore possible to accelerate the vehicle with good response while suppressing the heat generation of the second clutch CL2 at the racing selection.

[Problem Prevention Operation in Each Torque Absorption Restriction Condition]

The operation that prevents the heat amount of the second clutch CL2 from becoming excessive at this racing selection is a common problem prevention operation associated with the execution of the racing control, irrespective of the contents of the torque absorption restriction condition. In the following description, the problem prevention operation in each condition (the conditions 1 to 5) that restricts the torque absorption will be explained.

Condition 1

Regarding the battery charge capacity condition (the condition 1) which indicates that the battery SOC exceeds the setting threshold value, the setting threshold value is set to the certain value to judge whether the capacity that can absorb (charge) the energy from the motor/generator MG by the battery 4 is sufficiently secured or not, when the engine rotation speed increases in the engine racing state and this increased engine rotation speed is decreased by the negative torque of the motor/generator MG.

For example, in the case where the battery SOC is higher than the setting threshold value, when the racing control is permitted, the energy from the motor/generator MG is supplied to the battery 4 more than a free capacity of the battery 4, and this might promote deterioration and failure of the battery 4.

For this problem, in the case where the battery SOC exceeds the setting threshold value, since the rotation speed of the engine Eng is restricted regardless of the accelerator depression operation, the promotion of the deterioration and the failure of the battery 4, caused by the fact that the energy is supplied more than the free capacity of the battery 4, can be prevented. Endurance and reliability of the battery 4 can therefore be ensured.

Condition 2

Regarding the battery voltage condition (the condition 2) which indicates that the voltage of the battery 4 is out of the setting range, as same as the condition 1, the setting range is set to such range, with safety margin, that the battery 4 does not fail by the energy from the motor/generator MG, when the increased engine rotation speed is decreased by the negative torque of the motor/generator MG and the energy from the motor/generator MG is absorbed by the battery 4.

For example, in a case where the battery 4 is a lithium-ion secondary battery, when the racing control is permitted in a state in which voltage of the battery is high, there is a possibility that the battery 4 will be damaged by decomposition of an electrolyte. On the other hand, when the racing control is permitted in a state in which the voltage of the battery is too low, there is a possibility that the battery 4 will be damaged which is caused by the fact that when copper is used as an electrode material, the copper elutes then precipitates.

For this problem, in the case where the voltage of the battery 4 is out of the setting range, since the rotation speed of the engine Eng is restricted regardless of the accelerator depression operation, the damage of the battery 4 by the decomposition of the electrolyte and the elution of the electrode material can be prevented. Endurance and reliability of the battery 4 can therefore be ensured.

Condition 3

Regarding the battery temperature condition (the condition 3) which indicates that the temperature of the battery 4 is out of the setting range, as same as the condition 1, the setting range of the battery temperature is set to such range, with safety margin, that the battery 4 does not fail by the energy from the motor/generator MG also the battery 4 can surely absorb the energy, when the increased engine rotation speed is decreased by the negative torque of the motor/generator MG and the energy from the motor/generator MG is absorbed by the battery 4.

For example, when the temperature of the battery 4 is too high, the battery temperature further increases at the time of energy absorption, and this might promote deterioration and failure of the battery 4. On the other hand, when the temperature of the battery 4 is too low, the charge itself of the battery is not possible.

For this problem, in the case where the temperature of the battery 4 is out of the setting range, since the rotation speed of the engine Eng is restricted regardless of the accelerator depression operation, the promotion of the deterioration and the failure of the battery 4 can be prevented. Endurance and reliability of the battery 4 can therefore be ensured. In addition, the torque absorption (power-generation) in the state in which the charge itself of the battery is not possible can be avoided.

Condition 4

Regarding the motor temperature condition (the condition 4) which indicates that the temperature of the motor/generator MG exceeds the setting threshold value, the setting threshold value of the motor temperature is set to such threshold value, with safety margin, that the motor/generator MG does not fail by the temperature increase of the motor/generator MG, when the increased engine rotation speed is decreased by the negative torque of the motor/generator MG.

For example, in a case where the temperature of the motor/generator MG is too high, the temperature of the motor/generator MG further increases when decreasing the engine rotation speed, and this might cause a failure of the motor/generator MG.

For this problem, in the case where the temperature of the motor/generator MG exceeds the setting threshold value, since the rotation speed of the engine Eng is restricted regardless of the accelerator depression operation, the failure of the motor/generator MG can be prevented. Endurance and reliability of the motor/generator MG can therefore be ensured.

Condition 5

Regarding the inverter temperature condition (the condition 5) which indicates that the temperature of the inverter 3 exceeds the setting threshold value, the setting threshold value of the inverter temperature is set to such threshold value, with safety margin, that the inverter 3 does not fail by the temperature increase of the inverter 3, when the increased engine rotation speed is decreased by the negative torque of the motor/generator MG.

For example, in a case where the temperature of the inverter 3 is too high, the temperature of the inverter 3 further increases when supplying the energy from the motor/generator MG to the battery 4 through the inverter 3, and this might cause a failure of the inverter 3.

For this problem, in the case where the temperature of the inverter 3 exceeds the setting threshold value, since the rotation speed of the engine Eng is restricted regardless of the accelerator depression operation, the failure of the inverter 3 can be prevented. Endurance and reliability of the inverter 3 can there fore be ensured.

[Racing Permission Control Operation]

When the accelerator depression operation is done in the state in which the engine Eng is in the no-load state by selecting the parking range, in the flow chart in FIG. 5, the routine proceeds along step S1→step S2→step S3. When the condition 1 that is the torque absorption restriction condition is judged at this step S3 then "the battery SOC≤the setting threshold value" is judged, the routine proceeds to step S4 from step S3. When the condition 2 that is the battery voltage condition is judged at this step S4 then "the battery voltage is within the setting range" is judged, the routine proceeds to step S5 from step S4. When the condition 3 that is the battery temperature condition is judged at this step S5 then "the battery temperature is within the setting range" is judged, the routine proceeds to step S6 from step S5. When the condition 4 that is the motor temperature condition is judged at this step S6 then "the motor temperature is equal to or less than the setting threshold value" is judged, the routine proceeds to step S7 from step S6. When the condition 5 that is the inverter temperature condition is judged at this step S7 then "the inverter temperature is equal to or less than the setting threshold value" is judged, the routine proceeds to step S9 from step S7.

In the case where all of the conditions 1 to 5 that are the torque absorption restriction conditions are not satisfied, the racing permission control by the following each actuator operation is carried out at step S9.

The motor/generator MG: the torque cut control that outputs the zero-torque command is performed.

The engine Eng: the engine operation control that, after increasing the engine rotation speed according to the accelerator depression operation, maintains the engine rotation speed at the rotation speed that is within the target rotation speed determined by the power-generation torque limit amount, is performed.

The second clutch CL2: the disengagement state of the second clutch CL2 is maintained as it is.

In this manner, regarding the motor/generator MG, since the zero-torque command is outputted to the motor/generator MG, the rotor of the motor/generator MG connected to the engine Eng through the first clutch CL1 merely acts as the flywheel. That is, this is the same state as the engine vehicle that stops by the selection of the P range, the torque absorption by the power-generation of the motor/generator MG can not be performed, and the increase in the engine rotation speed by the torque absorption can not be suppressed.

Therefore, although the engine Eng generates the torque corresponding to the accelerator opening and the engine rotation speed is increased in response to the racing operation, by maintaining the engine rotation speed at the target rotation speed or less by a limiter operation that cuts the engine torque when the engine rotation speed becomes equal to or greater than the target rotation speed determined by the power-generation torque limit amount, the increase in the engine rotation speed is suppressed.

As described above, in the racing permission control of the embodiment 1, the torque cut control is performed for the motor/generator MG. As for the engine Eng, the engine operation control, which maintains the engine rotation speed at the rotation speed that is within the target rotation speed determined by the power-generation torque limit amount, is performed. Hence, while permitting the increase in the engine rotation speed which corresponds to the racing operation, it is possible to keep the difference rotation speed of the second clutch CL2 at the time of the racing selection operation within a range in which the difference rotation speed of the second clutch CL2 can be controlled by the torque absorption operation using the motor/generator MG.

[Racing Selection Control Operation]

When the driver performs the racing selection operation from the P range to the R range or from the P range to the D range during the racing forbiddance control at the time of the P range selection or during the racing permission control at the time of the P range selection, in the flow chart in FIG. 5, the routine proceeds along step S1→step S2→step S10→step S11. Then at step S11, the racing selection control by the following each actuator operation is carried out.

The engine Eng: the engine operation control which outputs the command that generates the target driving force and the torque equivalent to the power-generation amount is performed.

The motor/generator MG: the motor rotation speed control by which the MG rotation speed is the idle rotation speed is performed.

The second clutch CL2: the clutch engagement control that engages the second clutch CL2 from the disengagement state by the torque corresponding to the accelerator opening is performed.

In this manner, regarding the motor/generator MG, the motor/generator rotation speed control is performed so as to decrease the engine rotation speed at the time of the racing selection up to the idle rotation speed, with the idle rotation speed of the engine Eng being the target rotation speed. Thus, as a consequence, when the control is changed from the racing permission control to the racing selection control, the large negative torque command is outputted to the motor/generator MG, the load is then applied to the engine Eng. That is, by the torque absorption operation that absorbs the engine torque by the power-generation of the motor/generator MG, the engine rotation speed is decreased up to the idle rotation speed. As for the engine Eng, although the control which outputs the command that generates the target driving force and the torque equivalent to the power-generation amount is performed, by the torque absorption operation by the motor/generator MG, the engine torque is smoothly increased in a racing selection control start range.

Therefore, since the engine rotation speed is decreased up to the idle rotation speed in the racing selection control start range, the difference rotation speed of the second clutch CL2 can be suppressed low. In addition, although the engagement capacity of the second clutch CL2 gradually increases due to response delay of the hydraulic pressure in the racing selection control start range, the engine torque is smoothly increased at the same time as this increase of the engagement capacity of the second clutch CL2, thereby also preventing a slip caused by an excessive torque input to the second clutch CL2.

As described above, in the racing selection control of the embodiment 1, the engine operation control that generates the target driving force and the torque equivalent to the power-generation amount, the motor/generator rotation speed control with the idle rotation speed of the engine Eng being the target rotation speed and the second clutch engagement control that engages the second clutch CL2 by the torque corresponding to the accelerator opening, are performed. Hence, it is possible to start the vehicle with good response while effectively suppressing the heat generation of the second clutch CL2, which is an aim of the racing selection control.

[Racing Control Transition Operation]

Figure 9:
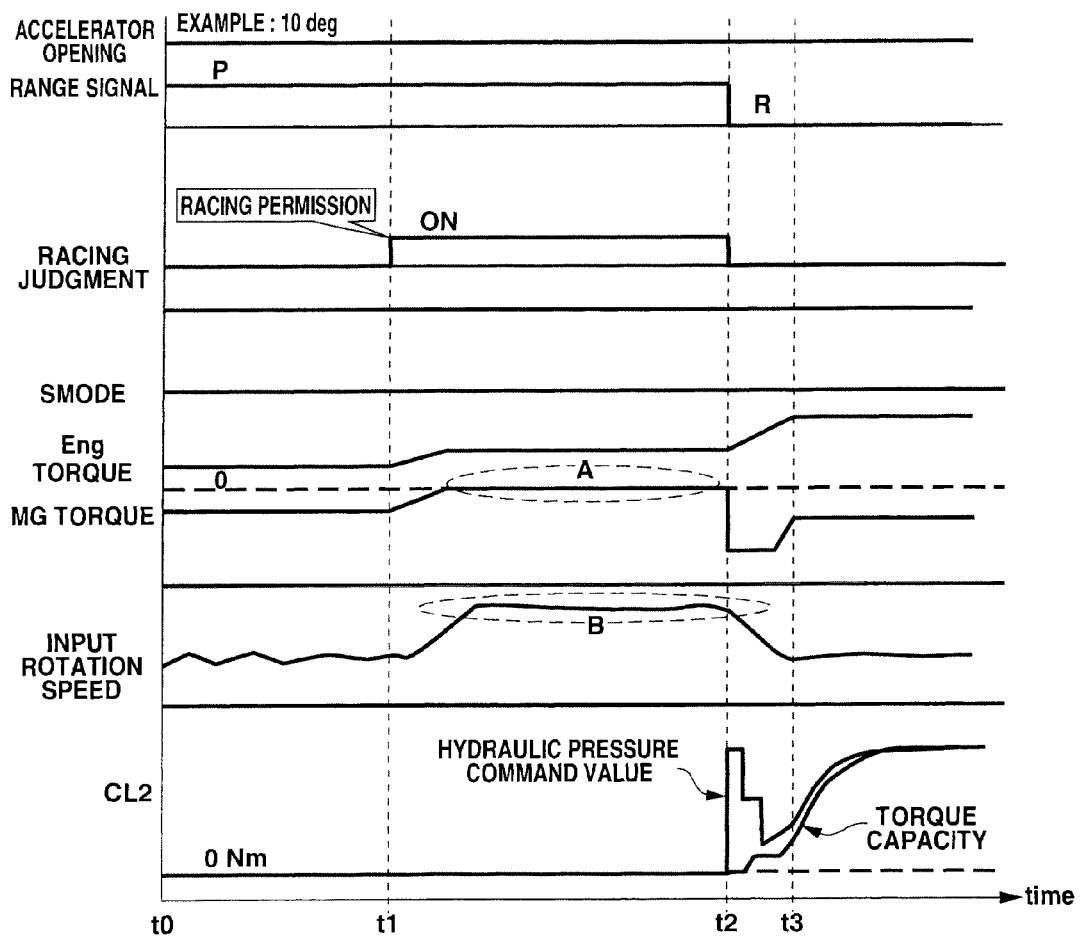
FIG. 9 shows time charts of each characteristic of accelerator opening, range signal, racing judgment, manual mode, engine torque, motor torque, input rotation speed, second clutch hydraulic pressure command value and second clutch torque capacity, at a time of a reverse start after changing a selection from a vehicle stop state by a selection of a parking range to a reverse range, in the hybrid vehicle equipped with the control apparatus of the embodiment 1.

FIG. 9 shows time charts of each characteristic of the accelerator opening, a range signal, the racing judgment, a manual mode, the engine torque, the motor torque, an input rotation speed, a second clutch hydraulic pressure command value and the second clutch torque capacity, at the time of the reverse start after changing the selection from the vehicle stop state by the selection of the parking range to the reverse range, in the hybrid vehicle equipped with the control apparatus of the embodiment 1. In the following description, the racing control transition operation will be explained using the time charts in FIG. 9.

First, whole transition operation will be explained. In the vehicle stop state by the selection of the P range during the accelerator depression, for time t0 to t1 for which the torque absorption restriction condition is satisfied, the racing forbiddance control is carried out. When the torque absorption restriction condition is not satisfied at time t1, the control is changed to the racing permission control, and the transition from the racing forbiddance control to the racing permission control occurs. Then when the range selection is changed to the R range at time t2 of the middle of the racing permission control, the transition from the racing permission control to the racing selection control occurs, and the vehicle starts backward.

The racing forbiddance control (time t0 to time t1) is aimed at preventing the problem caused by the fact that the racing control is permitted when the torque absorption restriction condition is satisfied. For this reason, each actuator operation is performed as follows.

The engine Eng: the engine Eng generates the torque equivalent to the power-generation.

The motor/generator MG: the motor/generator MG is controlled to the idle rotation speed.

The second clutch CL2: the second clutch CL2 is disengaged.

That is, although the operation is the racing operation by the accelerator depression, the racing that increases the engine rotation speed is forbidden for time t0 to t1 for which the torque absorption restriction condition is satisfied, and the engine rotation speed is maintained at the idle rotation speed as it is (the input rotation speed characteristic in FIG. 9). Then, as shown by the Eng torque characteristic and the MG torque characteristic, an engine torque amount for maintaining the idle rotation speed is generated by the motor/generator MG.

When the torque absorption restriction condition is not satisfied in the middle of the racing forbiddance control (at time t1), the transition from the racing forbiddance control to the racing permission control occurs. This racing permission control (time t1 to time t2) is aimed at determining the engine rotation speed by the MG torque limit amount. For this reason, each actuator operation is performed as follows.

The motor/generator MG: the torque cut (0 Nm-command).

The engine Eng: the engine Eng generates the torque corresponding to the accelerator opening. However, the torque is cut when the engine rotation speed is equal to or greater than the target rotation speed, and the engine rotation speed is controlled within the target rotation speed determined by the MG torque limit amount.

The second clutch CL2: disengagement.

That is, during the racing permission control, as shown by "A" in FIG. 9, a target power-generation torque and an MG assist torque are zero. Further, during the racing permission control, as shown by "B" in FIG. 9, the limiter operation is performed for the engine rotation speed (=the input rotation speed), then the engine rotation speed is controlled so as not to exceed the target rotation speed determined by the MG torque limit amount.

When the selection operation from the P range to the R range is performed in the middle of the racing permission control (at time t2), the transition from the racing permission control to the racing selection control occurs. This racing selection control (time t2 to time t3) is aimed at lessening the difference rotation of the starting clutch by the motor/generator MG, for fear of the burning of the starting clutch (the second clutch CL2) at the time of the racing selection control. For this reason, each actuator operation is performed as follows.

The engine Eng: the engine Eng generates the target driving force and the torque equivalent to the power-generation amount.

The motor/generator MG: the motor/generator MG is controlled to the idle rotation speed.

The second clutch CL2: the second clutch CL2 is engaged by the torque corresponding to the accelerator opening.

That is, in the racing selection control, by performing the rotation speed control of the motor/generator MG with the idle rotation speed being the target rotation speed, the torque cut control of the motor/generator MG is changed to the power generation mode immediately (the MG torque characteristic in FIG. 9). By the torque absorption operation by this power-generation, the engine rotation speed is decreased to an idle rotation speed range (the input rotation speed characteristic in FIG. 9). As a result, the difference rotation speed of the starting clutch (the second clutch CL2) is suppressed low. In addition, by the torque absorption operation by the power-generation, the engine torque has a smooth rising characteristic (the Eng torque characteristic in FIG. 9). Further, as for the second clutch CL2, as shown by the characteristics of the hydraulic pressure command value and the torque capacity in FIG. 9, the second clutch CL2 is engaged by a normal engagement control of the wet multiple disc clutch.

Next, effects of the present invention will be explained. The control apparatus of the hybrid vehicle in the embodiment 1 provides the following effects.

(1) The hybrid vehicle has, on the driveline, the engine Eng, the motor/generator MG, the clutch (the second clutch CL2) and the driving wheels (the rear-left and rear-right wheels RL, RR), and transmits the driving force from the engine Eng to the driving wheels (the rear-left and rear-right wheels RL, RR) through the motor/generator MG and the engaged clutch (the second clutch CL2) and brings the drive load that is applied to the engine Eng from the driving wheels (the rear-left and rear-right wheels RL, RR) to the no-load state by disengagement of the clutch (the second clutch CL2). The control apparatus of the hybrid vehicle comprises the racing control section (FIG. 5) which, when the accelerator depression operation is done in the state in which the engine Eng is in the no-load state, in the case where the torque absorption restriction condition that restricts torque absorption by the motor/generator MG with the engine torque being the power-generation torque is satisfied, restricts the rotation speed of the engine Eng.

Further, when the accelerator depression operation is done in the state in which the engine Eng is in the no-load state, in the case where the torque absorption restriction condition is satisfied, the racing control section (FIG. 5) forbids the racing that increases the engine rotation speed according to the accelerator depression operation.

Accordingly, when the condition that the torque absorption by the motor/generator MG be restricted is satisfied upon the racing operation at the time of acceleration including the vehicle start, the problems associated with execution of the racing control can be prevented, and the vehicle can be accelerated with good response while suppressing the heat generation of the clutch (the second clutch CL2).

(2) A power supply unit having the battery 4 and the inverter 3 is connected to the motor/generator MG, and the racing control section (FIG. 5) has the racing forbiddance control section (step S8) which, when the accelerator depression operation is done in the state in which the engine Eng is in the no-load state, in the case where at least one torque absorption restriction condition of the following conditions 1 to 5 is satisfied ("NO" at any step of steps S3 to S7), forbids the racing that increases the engine rotation speed according to the accelerator depression operation, condition 1: the battery charge capacity condition which indicates that the charge capacity of the battery 4 exceeds the setting threshold value, condition 2: the battery voltage condition which indicates that voltage of the battery 4 is out of the setting range, condition 3: the battery temperature condition which indicates that temperature of the battery 4 is out of the setting range, condition 4: the motor temperature condition which indicates that temperature of the motor/generator MG exceeds the setting threshold value, and condition 5: the inverter temperature condition which indicates that temperature of the inverter 3 exceeds the setting threshold value.

Therefore, in addition to the effect of the above (1), endurance and reliability of the motor/generator MG, the inverter 3 and the battery 4 which are the elements of the motor/generator system can be ensured with stability for a long time.

(3) The upper limit rotation speed of the engine rotation speed of the case where the torque absorption by the motor/generator MG with the engine torque being the power-generation torque is restricted when the accelerator depression operation is done in the state in which the engine Eng is in the no-load state, is set to the upper limit rotation speed that is the smallest value of the upper limit rotation speed determined according to the charge capacity of the battery 4, the upper limit rotation speed determined according to the voltage of the battery 4, the upper limit rotation speed determined according to temperature of the battery 4, the upper limit rotation speed determined according to the temperature of the motor/generator MG, the upper limit rotation speed determined according to the temperature of the inverter 3 and the upper limit rotation speed determined according to the voltage of the inverter 3.

With this setting, for instance, in the case where the battery charge capacity is high, the expansion of the difference rotation speed of the clutch (the second clutch CL2) is suppressed, and the heat amount of the clutch (the second clutch CL2) engaged by the racing selection is prevented from becoming excessive. In addition, for instance, in the case where the temperature of the motor/generator system is high, the temperature of the motor/generator system is prevented from further increasing.

(4) The racing control section (FIG. 5) has the racing permission control section (step S9) which, when the accelerator depression operation is done in the state in which the engine Eng is in the no-load state, in the case where the torque absorption restriction condition that restricts the torque absorption by the motor/generator MG with the engine torque being the power-generation torque is not satisfied ("YES" at steps S3 to S7), performs the torque cut control that outputs the zero-torque command for the motor/generator MG also performs the engine operation control that, after increasing the engine rotation speed according to the accelerator depression operation, maintains the engine rotation speed at the rotation speed that is within the target rotation speed determined by the power-generation torque limit amount.

Thus, in addition to the effects of the above (2) and (3), while permitting the increase in the engine rotation speed which corresponds to the racing operation, it is possible to keep the difference rotation speed of the clutch (the second clutch CL2) at the time of the racing selection operation within the range in which the difference rotation speed of the second clutch CL2 can be controlled by the torque absorption operation using the motor/generator MG.

(5) The racing control section (FIG. 5) has the racing selection control section (step S11) which, when the range position is changed from the stop range position to the travel range position ("YES" at step S10) with intent to start the vehicle in the vehicle stop state with the accelerator depression operation done in the state in which the engine Eng is in the no-load state, performs the engine operation control which outputs the command that generates the target driving force and the torque equivalent to the power-generation amount for the engine Eng, performs the motor rotation speed control by which the rotation speed of the motor/generator MG is the idle rotation speed and performs the clutch engagement control that engages the disengaged clutch (the second clutch CL2) by the torque corresponding to the accelerator opening.

Thus, in addition to the effects of the above (2), (3) and (4), it is possible to start the vehicle with good response while effectively suppressing the heat generation of the clutch (the second clutch CL2), which is the aim of the racing selection control.

Although the control apparatus of the hybrid vehicle according to the present invention has been explained on the basis of the embodiment 1, the present invention is not limited to the embodiment 1. As long as change and addition of design are not beyond the scope of the subject-matter of the claimed invention, they are allowed.

In the embodiment 1, as the torque absorption restriction condition, the example reciting five conditions is described. However, in a case of a system having a DC/DC converter, other torque absorption restriction conditions such as a converter temperature condition could be added. Or other torque absorption restriction conditions might replace some of the five conditions.

In the embodiment 1, the example in which the present invention is applied to the "1 motor+2 clutch" FR hybrid vehicle is described. However, an example in which the present invention is applied to a "1 motor+2 clutch" FF hybrid vehicle could be possible. Further, an example in which the present invention is applied to a "1 motor+1 clutch" motor-assist-type hybrid vehicle could be possible.

Figure 10:
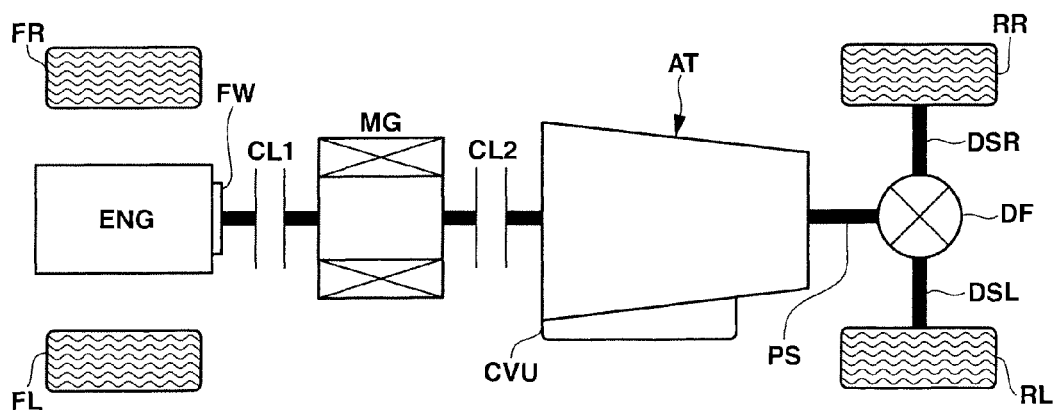
FIG. 10 is a schematic view of a driveline of an FR hybrid vehicle where a separate second clutch is disposed between a motor/generator and a transmission.
Figure 11:
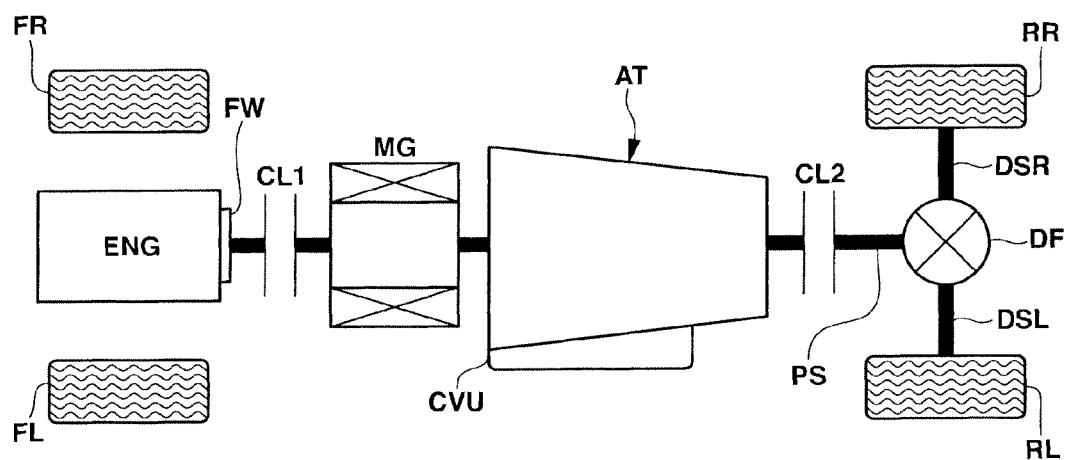
FIG. 11 is a schematic view of a driveline of an FR hybrid vehicle where the separate second clutch is disposed between the transmission and driving wheels.

In the embodiment 1, as the second clutch CL2 that is the starting clutch, one of the frictional engagement elements which are engaged in the automatic transmission AT is used. However, as shown in FIG. 10, a separate second clutch CL2 could be arranged between the motor/generator MG and the automatic transmission AT. Furthermore, as shown in FIG. 11, the second clutch CL2 could be arranged between the automatic transmission AT and the driving wheels RL, RR.

The invention claimed is:

1. A control apparatus of a hybrid vehicle comprising:
   a hybrid drive system having, on a driveline, an engine, a motor/generator, a clutch and driving wheels, the hybrid drive system being configured to transmit a driving force from the engine to the driving wheels through the motor/generator and the clutch and to bring a drive load applied to the engine from the driving wheels to a no-load state by disengagement of the clutch; and
   a racing controller configured to restrict a rotation speed of the engine during an accelerator depression operation performed while the engine is in the no-load state at a time of acceleration so as to race the engine, and a torque absorption restriction condition is satisfied, satisfaction of the torque absorption restriction condition being such that torque absorption by the motor/generator is restricted such that an engine torque is a power-generation torque,
   wherein the control apparatus is configured such that the rotation speed of the engine increases in accordance with the accelerator depression operation, and the engine is configured to be raced by the accelerator depression operation,
   wherein, while the torque absorption by the motor/generator is restricted such that the engine torque is the power-generation torque, and the accelerator depression operation is performed with the engine being in the no-load state such that the engine is raced, an upper limit rotation speed of the rotation speed of the engine is set to an upper limit rotation speed that is a smallest value of at least an upper limit rotation speed determined according to a charge capacity of a battery and an upper limit rotation speed determined according to a temperature of the battery.

2. The control apparatus of the hybrid vehicle as claimed in claim 1, wherein:
   while the torque absorption by the motor/generator is restricted such that the engine torque is the power generation torque during performance of the accelerator depression operation with the engine being in the no-load state, the upper limit rotation speed of the rotation speed of the engine is set to an upper limit rotation speed, and
   the upper limit rotation speed is a smallest value of the upper limit rotation speed determined according to the charge capacity of the battery, an upper limit rotation speed determined according to a voltage of the battery, the upper limit rotation speed determined according to the temperature of the battery, an upper limit rotation speed determined according to a temperature of the motor/generator, an upper limit rotation speed determined according to a temperature of an inverter, and an upper limit rotation speed determined according to a voltage of the inverter.

3. The control apparatus of the hybrid vehicle as claimed in claim 1, wherein:

the racing controller comprises a racing permission controller configured to perform a torque cut control outputting a zero-torque command for the motor/generator so as to control operation of the engine, and the torque cut control comprises controlling the engine such that, after increasing the rotation speed of the engine according to the accelerator depression operation, the rotation speed of the engine is maintained within a target rotation speed determined in accordance with a power-generation torque limit amount, during performance of the accelerator depression operation while the engine is in the no-load state and the torque absorption restriction condition is unsatisfied.

4. The control apparatus of the hybrid vehicle as claimed in claim 3, wherein:

the racing controller comprises a racing selection controller configured to change a range position from a stop range position to a travel range position so as to start the vehicle in a vehicle stop state with the accelerator depression operation performed while the engine is in the no-load state, and the racing selection controller is configured to perform an engine operation control so as to output a command that generates a target driving force and a torque equivalent to a power-generation amount for the engine, perform a motor rotation speed control such that a rotation speed of the motor/generator is an idle rotation speed, and perform a clutch engagement control so as to engage the disengaged clutch by a torque corresponding to an accelerator opening.

5. The control apparatus of claim 1, wherein the racing controller is configured to restrict the rotation speed of the engine while the vehicle is stopped.

6. The control apparatus of claim 1, wherein the racing controller is configured such that the time of acceleration includes a vehicle start time.

* * * * *